United States Patent Office 2,884,450
Patented Apr. 28, 1959

2,884,450

HYDROGENATION OF UNSATURATED DILACTONES TO 1,8-OCTANEDIOIC ACIDS AND 1,8-OCTANEDIOLS WITH COPPER CHROMITE CATALYSTS

Howard E. Holmquist, Wilmington, Del., assignor to E. I. du Pont de Nemours and Company, Wilmington, Del., a corporation of Delaware No Drawing. Application April 20, 1956
Serial No. 579,459

13 Claims. (Cl. 260—537)

This invention relates to a new method for preparing acids and glycols containing a long chain, such as suberic acid and octamethylene glycol. More particularly this invention relates to a novel catalytic hydrogenation process for converting certain dilactones into long chain acids and glycols, such as suberic acid and octamethylene glycol.

New unsaturated dilactones are obtained when acetylenes are reacted with carbon monoxide in the presence of a catalytic amount of a cobalt carbonyl. These new unsaturated dilactones and their preparation are the subject matter of the copending patent application of J. C. Sauer, Ser. No. 432,599, filed May 26, 1954, now abandoned, and continuation-in-part patent application thereof Ser. No 549,155, filed Nov. 25, 1955, now Patent No. 2,840,570. These new unsaturated dilactones correspond in composition to $C_8(RR')_2O_4$, wherein R and R' are hydrogen, haloaryl, alkoxyaryl, or hydrocarbon free from non-aromatic unsaturation, and show strong absorption lines in the ultraviolet spectra in the region of 3300–4400 A., and yield suberic acids on hydrogenation over platinum in acetic acid.

Long chain acids and glycols, such as suberic acid and octamethylene glycol, are useful for preparing solid polyesters, coating compositions, medicinal chemicals, and for various other industrial purposes. However, no single method for their preparation from readily available, low cost, starting materials is known.

This application is a continuation-in-part of my copending patent application Serial No. 488,991, filed February 17, 1955, now abandoned.

It is an object of this invention to provide a new method for preparing long chain dibasic acids and glycols in which the functional groups, i.e., the carboxyl and hydroxyl groups are respectively on the 1,6 and 1,8 carbons, particularly suberic acid and octamethylene glycol. A further object is to provide a novel catalytic hydrogenation process for converting certain dilactones into said long chain acids and glycols and particularly into suberic acid and octamethylene glycol. A still further object is to convert abundantly available and relatively inexpensive carbon monoxide and acetylenic hydrocarbons in two steps to said long chain acids and glycols and especially into suberic acid and octamethylene glycol. Other objects will appear hereinafter.

These and other objects of this invention are accomplished by the following invention of a process for preparing 1,8-octanedioic acids and 1,8-octanediols which comprises hydrogenating a dilactone having in its ultraviolet spectrum a strong absorption line in the region of 3300 to 4400 A. and of the general formula $C_8(RR')_2O_4$ in which R and R' are hydrogen, haloaryl, alkoxyaryl or monovalent hydrocarbon radicals free from non-aromatic unsaturation, at 150° to 325° C. under a pressure of at least 10 atmospheres over a copper chromite containing catalyst.

This invention particularly provides a novel method for preparing suberic acid and octamethylene glycol which comprises hydrogenating, at a temperature within the range of 150° to 325° C. under a hydrogen pressure of at least 10 atmospheres in contact with a copper chromite catalyst, the dilactone [$\Delta^{2,2'(5H,5'H)}$-bifuran]-5,5'-dione.

In an convenient way of operating the process of this invention, a pressure reactor is charged with the dilactone, a solvent therefor, and at least 5% of a copper chromite catalyst. The reactor is then swept with oxygen-free nitrogen, placed on an agitating rack, pressured with hydrogen to at least 10 atmospheres, and the charge heated to at least 150° C. After hydrogen absorption has ceased, usually in about 2 to 4 hours, the reactor is permitted to cool. The reactor is opened and the contents are discharged and filtered to remove the catalyst. The desired product is conveniently isolated by distillation under reduced pressure, or other methods known to those skilled in the art.

The examples which follow are submitted to illustrate and not to limit this invention.

*Example I*

A mixture of 18.9 g. of the dilactone, [$\Delta^{2,2'(5H,5'H)}$-bifuran]-5,5'-dione, prepared as described subsequently, 5 g. of copper barium chromite catalyst, and 200 ml. of dioxane was shaken in a 400-ml. steel reactor at 290° C. with hydrogen at a pressure of 2500–3000 lb./sq. in. for 3½ hours. The product was filtered and concentrated by distillation under reduced pressure to give a residue from which 9.1 g. of a crystalline solid was obtained by chilling. Distillation of the filtrate gave another 1.1 g. of the solid, B.P. 120–130° C. (1.8 mm.). The solid product was recrystallized twice from chloroform, M.P. 59.5° C., and was identified as octamethylene glycol (literature M.P. 60° C.).

*Analysis.*—Calc'd. for $C_8H_{18}O_2$: C, 65.71; H, 12.41; M.W., 146. Found: C, 65.61; H, 12.34; M.W., 149, 152.

A portion of the product was converted to the bis-N-phenylcarbamate, M.P. 175° C. (uncorrected), after recrystallization from chloroform (the literature melting point of this derivative is 173° C.).

*Example II*

A mixture of 24.6 g. of the dilactone of Example I, 5 g. of copper barium chromite, and 200 ml. of dioxane was shaken at 300° C. with hydrogen at 2500–3000 lb./sq. in. for three hours. The filtered product was distilled at 1.7 mm. to give 2.5 g. of 2-(4-hydroxybutyl)tetrahydrofuran, a colorless liquid, B.P. 80–85° C., 5.8 g. of octamethylene glycol, B.P. 120–140° C., and 6.3 g. of a liquid boiling at 140–180° C.

*Example III*

A mixture of 24.8 g. of the dilactone of Example I, 8.5 g. of copper barium chromite catalyst, and 200 ml. of dioxane was shaken at 250° C. with hydrogen at 3000 lb./sq. in. for four hours. The filtered product was concentrated under reduced pressure to leave 23.7 g. of a viscous liquid which was distilled to give 5.3 g. of octamethylene glycol, B.P 143–156° C./3–4 mm.

*Example IV*

A solution of 28 g. of the dilactone of Example I in 200 ml. of dioxane was shaken with hydrogen at 3000 lb./sq. in. and 280° C. in the presence of 5.6 g. of copper chromite catalyst. From the concentrated solution there was recrystallized 5.36 g. of octamethylene glycol. The filtrate was distilled to give 3.0 g. of 2-(4-hydroxybutyl)tetrahydrofuran, as a colorless liquid, B.P. 87–92° C./2.8 mm., $n_D^{25}$ 1.4562. The remainder of the hydrogenation product was dissolved in a petroleum etherchloroform mixture and chilled; another 3.1 g. octamethylene glycol was obtained. The total yield of octamethylene glycol obtained was 34%.

The dilactone used in Examples I through IV is the product disclosed and claimed in the copending applications of J. C. Sauer Ser. No. 432,599, filed May 26, 1954, now abandoned, and Ser. No. 549,155, filed November 25, 1955, and prepared as follows:

Into a 400-ml. steel bomb was charged 26 g. of acetylene, 200 ml. of acetone, and 1.5 g. of dicobalt octacarbonyl. The mixture was heated at 100° C. with carbon monoxide at a pressure of 1000 atmospheres for 14–17 hours. The product was filtered and the brown solid was extracted with ethyl acetate for 24 hours. The extract was permitted to crystallize and the crystalline material separated, and dried at room temperature. There was obtained 20 g. of an unsaturated dilactone of formula $C_8H_4O_4$, M.P. 229° C., after several recrystallizations from acetic acid. This dilactone exists in cis- and trans-isomeric forms and corresponds to $[\Delta^{2,2'(5H,5'H)}$-bifuran]-5,5'-dione.

*Example V*

A sample of di-n-butyldilactone was prepared by the cobalt carbonyl-catalyzed reaction of n-butylacetylene with carbon monoxide, as in Example V in application of J. C. Sauer, U. S. Ser. No. 432,599, now abandoned. A solution of 6.5 g. of the di-n-butyldilactone in 200 ml. of dioxane was shaken at a pressure of 3000 lb./sq. in. of hydrogen at 275° C. in the presence of 1 g. of copper barium chromite catalyst. The solution was filtered and concentrated under reduced pressure. The residue was distilled through a small spinning bank column. The first two fractions consisted mostly of hexadecanediol (di-n-butyloctamethylene glycol). Fraction 1: B.P. 120–132° C. at 0.1 mm., 1.2 g.; $n_D^{25}$ 1.4584. Analysis: C, 76.08, 76.79; H, 12.44, 12.47; M.W., 255, 238. Fraction 2: B.P. 130–140° C. at 0.1 mm., 1.2 g.; $n_D^{25}$ 1.4647.

*Analysis.*—Calc'd. for $C_{16}H_{34}O_2$: C, 74.36; H, 13.26; M.W., 258. Found: C, 75.79; H, 12.41; M.W. 245, 247.

The infrared spectra indicated the presence of hydroxyl groups as well as carbonyl impurities which are probably in the form of lactone linkages.

*Example VI*

A solution of 19.8 g. (1.21 moles) of the dilactone, $[\Delta^{2,2'(5H,5'H)}$-bifuran]-5,5'-dione, in 200 ml. of dioxane was hydrogenated at 190° C. and 2000–3000 lb./sq. in. for 3.5 hours with 5 g. of a copper barium chromite catalyst. During the reaction period there was a total observed pressure drop of 800–1000 lb./sq. in. The resulting blue solution was filtered to remove the catalyst and concentrated under reduced pressure to leave a moist residue which amounted to 21.1 g. The residue was taken up in chloroform and petroleum ether and chilled to give 5.3 g. of crude suberic acid, M.P. 124–128° C. After several recrystallizations from chloroform the M.P. was 141° C. The liquid remaining after the recrystallization of the crude suberic acid was distilled at 1.8 mm. to give a forerun (0.8 g.) at 110–170° C. and material distilling at 175–178° C. from which there was crystallized another 1.0 g. of suberic acid, making a total yield of 6.3 g. which corresponds to a 30% yield.

*Analysis.*—Calc'd. for $C_8H_{14}O_4$: C, 55.16; H, 8.10; M.W., 174. Found: C, 54.71, 54.61, H, 7.88, 8.13; M.W., 186, 188.

*Example VII*

Example VI was repeated using a charge consisting of 21.4 g. of the dilactone, 200 ml. of dioxane and 4 g. of copper barium chromite catalyst and operating at 160° C. under 3000 lb./sq. in. for 4 hours. During this time there was an observed pressure drop of 500–600 lb./sq. in. The reaction mixture was filtered to remove the catalyst and the filtrate concentrated under reduced pressure. The solid which crystallized from the concentrate on cooling was separated by filtration and amounted to 1.7 g. and was shown by a mixed melting point determination and by comparison of the infrared spectrum with that of an authentic sample to be suberic acid. The filtrate was treated with 5% sodium hydroxide, the solution filtered, acidified, and extracted with methyl ethyl ketone. From the extract there was obtained another 1.5 g. of suberic acid, making a total yield of 14%.

*Example VIII*

Example VI was repeated, using a charge consisting of 25 g. of dilactone, 200 ml. of dioxane and 5 g. of a magnesium promoted copper chromite catalyst and operating at 200° under 3000 lb./sq. in. pressure for 3.5 hours. During this time there was an observed pressure drop amounting to 1600 lb./sq. in. The reaction mixture was filtered to separate the catalyst and the filtrate concentrated under reduced pressure. From the concentrate there separated 3.4 g. of suberic acid.

The hydrogenation is carried out at temperatures which are at least 150° C. but below 325° C. At temperatures below 225° C. the principal product of the reaction is suberic acid and above 225° C. it is octamethylene glycol. If the process is being carried out to produce suberic acid primarily, then the most favorable temperature conditions to employ are in the range of 160° C. to 200° C. and if it is to produce octamethylene glycol then temperatures of from 250–310° C. are preferably used. As the temperature rises above 200° C., hydrogenolysis of the suberic acid begins to take place with formation of increasing amounts of octamethylene glycol, and as previously indicated it becomes the principal reaction at temperatures above 225° C.

Example V in the copending application of J. C. Sauer, Ser. No. 432,599, filed May 26, 1954, now abandoned, describes the preparation of di-n-butyldilactone as follows:

A pressure reactor was charged with 100 ml. of acetone, 2 g. of cobalt carbonyl, and 82 g. of n-butylacetylene, and the charge heated at 95–120° C. under a carbon monoxide pressure of 700–900 atmospheres. These conditions were maintained for 18 hours, during which time the pressure was maintained at the indicated level by periodically repressuring with carbon monoxide. The crude reaction mixture was discharged from the reactor and distilled. The product from the fraction distilling at 190–205°C./2 mm. crystallized upon standing. A portion of the distillate was recrystallized from petroleum ether containing a small amount of ethyl acetate. After two recrystallizations the cream colored solid had a block melting point of 124° C. and was found to analyze as follows:

*Analysis.*—Calc'd. for $C_{16}H_{20}O_4$: C, 69.50; H, 7.30; M.W., 276. Found: C, 69.20; H, 7.36; M.W., 270, 270.

The ultraviolet absorption spectra show a strong peak at 3475 A. and a weak peak at 2600 A. (the specific absorptivity $k_{3475\ A.}=144$), which corresponds closely to the spectra of the unsubstituted dilactone.

Although the working examples have illustrated batch operation, it is to be understood that the hydrogenation can be carried out as a continuous or semi-continuous up-flow, down-flow, co-current, or counter-current vapor or liquid phase operation.

The process may be operated at pressures of at least 10 atmospheres but because reaction rate and yield are improved by increasing the pressure in excess of 100 atmospheres, the use of such pressure conditions is preferred. Generally, raising the pressure to above 1000 atmospheres does not result in any practical advantage and that therefore represents a practical upper limit of pressure.

The hydrogenation is effected in the presence of a liquid reaction medium both to provide better contact between catalyst and reactants and to dissipate the heat of reaction. Suitable normally liquid inert organic reaction media are dioxane, cyclohexane, diethyl ether, toluene, xylene, benzene, and the like. The amount of reaction medium is not critical. A convenient amount will be from equal parts to 100 times the weight of the dilactone being hydrogenated.

The copper chromite catalyst is prepared as described in U.S. Patents 2,094,611, issued Oct. 3, 1937, and 2,040,944, issued May 19, 1936. Especially good results are obtained with a copper chromite promoted with barium chromite, for example, a copper barium chromite catalyst prepared in accord with Example III in U.S. Patent 2,040,944.

In general, the amount of catalyst is at least 5% by weight of the dilactone being hydrogenated. Since the rate of the hydrogenation is improved by increasing the catalyst concentration, usually an amount of catalyst is employed which is at least 10% and preferably at least 20% by weight of the dilactone.

The dilactones employed in this invention correspond to $C_8(RR')_2O_4$, wherein the R and R' are hydrogen, alkoxyaryl, especially where the alkoxy radical is not more than 12 carbon atoms and the aryl radical is hydrocarbon of not more than 10 carbon atoms, haloaryl, especially chloroaryl where the aryl radical is hydrocarbon of not more than 10 carbon atoms, or monovalent hydrocarbon radicals free from non-aromatic unsaturation, especially of not more than 12 carbon atoms, e.g., alkyl, especially short chain alkyl, i.e., containing less than 7 carbon atoms, aryl, especially where the aryl radical is hydrocarbon of not more than 7 carbon atoms, aralkyl, especially of not more than 7 carbon atoms, or cycloalkyl, particularly of not more than 7 carbon atoms. Examples of such radicals are methyl, ethyl, octyl, decyl, dodecyl, phenyl, tolyl, xylyl, benzyl, cyclohexyl, naphthyl, methylcyclohexyl, methoxyphenyl, ethoxyphenyl, decycloxyphenyl, dodecyloxyphenyl, dodecyloxynaphthyl, chlorophenyl, chloronaphthyl, and the like. These dilactones show strong lines in the ultraviolet spectra in the region of 3300–4400 A. and yield suberic acids on hydrogenation over platinum in acetic acid.

These dilactones can be position isomers corresponding to the cis and trans forms of

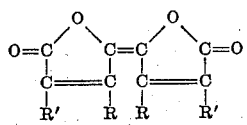

of

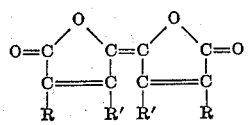

and of

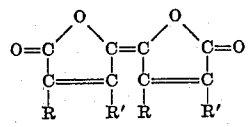

wherein R and R' are defined as aforesaid. These unsaturated dilactones can be represented by the general formulae:

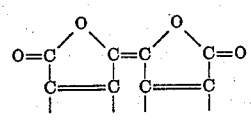

and

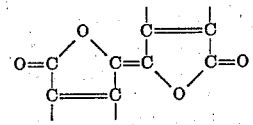

wherein one free valence of each ring is satisfied by R and the other free valences of said rings are satisfied by R', said R and R' being defined as previously indicated.

The dilactone from acetylene and carbon monoxide is [Δ$^{2,2'(5H,5'H)}$-bifuran]-5,5'-dione corresponding in molecular formula to $C_8H_4O_4$. This dilactone exists in two structural isomeric forms, a trans and a cis form, as follows:

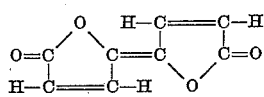

Lower melting trans form and

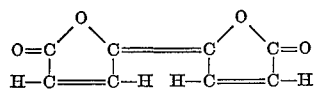

Higher melting cis form

The lower melting isomer has a melting point of 230–237° C. and the higher melting isomer melts at 240–248° C., determined in a capillary tube in an electrically heated melting point apparatus. The isomers can be recrystallized repeatedly from methyl ethyl ketone to give products melting at 235° C. and 247° C., respectively, when a setting is used such that the temperature increases from 175–200° C. in 6 minutes, from 200–225° C. in 9 minutes, and from 225–247° C. in 11 minutes. The melting is generally accompanied by sublimation and decomposition. The two isomers are further distinguished by their ultraviolet absorption spectra. The lower melting isomer has its maximum absorption at about 3400 A. and its specific absorbance, $k_{3400\ A.}$, is 200–204. The higher melting isomer has its maximum absorption at 3340 A. and its specific absorbance, $k_{3340\ A.}$ is 220–224. Thus, the ultraviolet specific absorbance for the $C_8H_4O_4$ dilactone is from 200 to 224.

On the basis of infrared spectra the lower melting isomer is assigned the trans configuration and the higher melting isomer the cis configuration. The selection of the cis structure for the high melting isomer rests primarily on the infrared absorption peaks at 6.0μ and 6.5μ (doublet) in the conjugated unsaturation region. The intense band at 6.0μ which is virtually absent for the low melting isomer, is due to the bridge double bond. In the trans structure, this double bond is astride a center of symmetry and will not absorb. The cis structure has no center of symmetry and the central double bond will absorb. The doublet at 6.5μ in the spectra of the high melting form is due to the ethylenic double bond of each ring. The low melting form shows only a single peak at 6.5μ and this is consistent with a trans structure having a center of symmetry.

As previously disclosed the above dilactones are obtained by reacting an acetylene with carbon monoxide in the presence of a cobalt carbonyl catalyst, as disclosed and claimed in the copending application of J. C. Sauer Ser. No. 432,599, filed May 26, 1954, now abandoned, and in its continuation-in-part, Ser. No. 549,155, filed November 25, 1955.

Acetylenes usefully employable in preparing these dilactones are those in which the sole Zerewitinoff active hydrogen is acetylenic hydrogen and correspond to R—C≡C—R', wherein R and R' are hydrogen, alkoxyaryl, especially where the alkoxy radical is not more than 12 carbon atoms and the aryl radical is hydrocarbon of not more than 10 carbon atoms, haloaryl, especially chloroaryl where the aryl radical is hydrocarbon of not more than 10 carbon atoms, or monovalent hydrocarbon radicals which are free from non-aromatic unsaturation, especially of not more than 12 carbon atoms, e.g. alkyl, especially short chain alkyl, i.e., containing less than seven carbon atoms, aryl, especially where the aryl radical is hydrocarbon of not more than 10 carbon atoms, aralkyl, especially of not more than seven carbons, or cycloalkyl, particularly of not more than seven carbon atoms. Examples of such acetylenes are acetylene, mono- and dialkyl-substituted acetylenes, e.g., methylacetylene, 2-decyne, phenylacetylene, diphenylacetylene, benzylacetylene, and cyclohexylacetylene.

By employing such substituted acetylenes in preparing the dilactones $C_8(RR')_2O_4$, the radicals R and R' will correspond to the substituents attached to the triply bonded carbon atoms in the acetylene reactant, i.e., R and R' in R—C≡C—R'. Thus, as shown by said Sauer coninuation-in-part application, Serial No. 549,155, filed Nov. 25, 1955, there are prepared the dilactones:

[Δ$^{2,2'(5H,5'H)}$]-bi(phenylfuran)]-5,5'-dione,
[Δ$^{2,2'(5H,5'H)}$]-bi(diethylfuran)]-5,5'-dione,
[Δ$^{2,2'(5H,5'H)}$]-bi-(n-butylfuran)]-5,5'-dione,
[Δ$^{2,2'(5H,5'H)}$]-bi(β-naphthylfuran)]-5,5'-dione,
[Δ$^{2,2'(5H,5'H)}$]-bi(chlorophenylfuran)]-5,5'-dione,
[Δ$^{2,2'(5H,5'H)}$]-bi(o-methoxyphenylfuran)]-5,5'-dione, and the like. When these substituted dilactones replace the dilactone of Example I in the process of Example I there are obtained the corresponding substituted 1,8-octanediols. Similarly, when these substituted dilactones are substituted for the dilactone of Example VI in the process of Example VI there are obtained the corresponding suberic acids.

The reaction between the acetylene and carbon monoxide is generally effected in the presence of an inert organic medium. Specific media of this kind are isooctane, toluene, acetonitrile, acetone, methyl ethyl ketone, ethyl acetate, dioxane, diethyl ether, xylene, benzene, N-methylpyrrolidone, and the like.

The cobalt carbonyl may be made by direct reaction of carbon monoxide with the metal in active form, as described in J. Am. Chem. Soc. 70, 383–6 (1948).

The process of this invention is a marked advance over previously known methods for preparing 1,8-octanedioic acids and long chain glycols and particularly suberic acid and octamethylene glycol in that it makes it possible to prepare these compounds in two steps from cheap, abundantly available acetylenes and carbon monoxide. The process is versatile in that by proper selection of the temperature conditions it is possible to prepare 1,8-octanedioic acids or glycols containing eight carbons between hydroxyl groups without otherwise having to alter process conditions. Thus, the process not only makes suberic acid and octamethylene glycol readily available at a potentially low cost, but also makes accessible other 1,8-octanedioic acids and 1,8-octanediols containing hydrocarbon substituents hitherto available only by tedious, complicated, expensive procedures.

Long chain dibasic acids and glycols, such as suberic acid and octamethylene glycol, are valuable products for the preparation of polyesters which are fiber forming.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for preparing a compound selected from the class consisting of 1,8-octanedioic acids and 1,8-octanediols which comprises hydrogenating, at a temperature within the range of 150° to 325° C. under a hydrogen pressure of at least 10 atmospheres, and in contact with a copper chromite containing catalyst, a dilactone represented by one of the formulas selected from the class consisting of

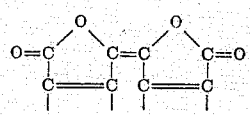

and

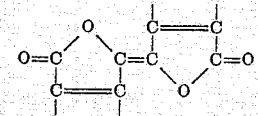

wherein one free valence of each ring in said formulas is satisfied by R and the other free valence in each ring of said formulas is satisfied by R', said R and R' being selected from the class consisting of hydrogen, alkoxyaryl where the alkoxy radical is not more than 12 carbon atoms and the aryl radical is hydrocarbon of not more than 10 carbon atoms, haloaryl where the aryl radical is hydrocarbon of not more than 10 carbon atoms, and monovalent hydrocarbon radicals, free from non-aromatic unsaturation, of not more than 12 carbon atoms, and obtaining as a resulting product a compound selected from the class consisting of 1,8-octanedioic acids and 1,8-octanediols.

2. Process as set forth in claim 1 wherein said copper chromite containing catalyst is a copper barium chromite catalyst.

3. Process as set forth in claim 1 wherein said dilactone is hydrogenated in a normally liquid inert organic reaction medium under a hydrogen pressure in excess of 100 atmospheres and said copper chromite containing catalyst is a copper barium chromite catalyst in amount of at least 10% by weight of said dilactone.

4. Process for preparing a compound selected from the class consisting of 1,8-octanedioic acids and 1,8-octanediols which comprises hydrogenating, at a temperature within the range of 150° to 325° C. under a hydrogen pressure of at least 10 atmospheres, and in contact with a copper chromite containing catalyst, the dilactone [Δ$^{2,2'(5H,5'H)}$-bifuran]-5,5'-dione, and obtaining as a resulting product a compound selected from the class consisting of 1,8-octanedioic acids and 1,8-octanediols.

5. Process for preparing octamethylene glycol which comprises hydrogenating, at a temperature within the range of 250° to 310° C., in a normally liquid inert organic reaction medium under a hydrogen pressure within the range of 2500 to 3000 lbs./sq. in., and in contact with a copper barium chromite catalyst, the dilactone [Δ$^{2,2'(5H,5'H)}$-bifuran]5,5'-dione, and obtaining octamethylene glycol as a resulting product.

6. Process as set forth in claim 5 wherein said normally liquid inert organic reaction medium is dioxane.

7. Process for preparing octamethylene glycol which comprises hydrogenating at a temperature within the range of 225 to 325° C. under a hydrogen pressure of at least 10 atmospheres, and in contact with a copper chromite containing catalyst, the dilactone [Δ$^{2,2'(5H,5'H)}$-bifuran]-5,5'-dione, and obtaining octamethylene glycol as a resulting product.

8. Process for preparing octamethylene glycol which comprises hydrogenating at a temperature within the range of 225 to 325° C. under a hydrogen pressure of at least 10 atmospheres, and in contact with a copper barium chromite catalyst, the dilactone [Δ$^{2,2'(5H,5'H)}$-bifuran]-5,5'-dione, and obtaining octamethylene glycol as a resulting product.

9. Process for preparing octamethylene glycol which comprises hydrogenating at a temperature within the range of 225 to 325° C., in a normally liquid inert organic reaction medium, under a pressure in excess of 100 atmospheres, and in contact with a copper barium chromite catalyst, the dilactone [Δ$^{2,2'(5H,5'H)}$-bifuran]-5,5'-dione, and obtaining octamethylene glycol as a resulting product.

10. Process for preparing octamethylene glycol as set forth in claim 9 wherein said dilactone is hydrogenated at a temperature within the range of 250° to 310° C.

11. Process for preparing suberic acid which comprises hydrogenating at a temperature within the range of 150 to 225° C. under a hydrogen pressure of at least 10 atmospheres, and in contact with a copper chromite containing catalyst, the dilactone [$\Delta^{2,2'(5H,5'H)}$-bifuran]-5,5'-dione, and obtaining suberic acid as a resulting product.

12. Process for preparing suberic acid which comprises hydrogenating at a temperature within the range of 150 to 225° C. under a hydrogen pressure of at least 10 atmospheres, and in contact with a copper barium chromite catalyst, the dilactone [$\Delta^{2,2'(5H,5'H)}$-bifuran]-5,5'-dione, and obtaining suberic acid as a resulting product.

13. Process for preparaing suberic acid which comprises hydrogenating at a temperature within the range of 150 to 225° C., in a normally liquid inert organic reaction medium, under a pressure in excess of 100 atmospheres, and in contact with a copper barium chromite catalyst, the dilactone [$\Delta^{2,2'(5H,5'H)}$-bifuran]-5,5'-dione, and obtaining suberic acid as a resulting product.

References Cited in the file of this patent
UNITED STATES PATENTS

| | | |
|---|---|---|
| 2,473,406 | Zellner et al. | June 14, 1949 |
| 2,704,771 | Smith | Mar. 22, 1955 |

OTHER REFERENCES

Folkers et al.: J. A. C. S., vol. 54, 1932, p. 1145.
Christian et al.: J. A. C. S., vol. 69, p. 1961 (1947).